United States Patent
Knauft et al.

(10) Patent No.: US 9,591,613 B2
(45) Date of Patent: Mar. 7, 2017

(54) ADAPTIVE PAGING USING USER EQUIPMENT LOCALIZATION METHOD IN A NETWORK

(71) Applicants: James P. Knauft, Warrenville, IL (US); Gordon S. Milliken, North Aurora, IL (US); Keith R. Stanley, Warrenville, IL (US)

(72) Inventors: James P. Knauft, Warrenville, IL (US); Gordon S. Milliken, North Aurora, IL (US); Keith R. Stanley, Warrenville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 55 days.

(21) Appl. No.: 14/555,782

(22) Filed: Nov. 28, 2014

(65) Prior Publication Data
US 2016/0157207 A1    Jun. 2, 2016

(51) Int. Cl.
*H04W 68/02* (2009.01)
*H04W 4/02* (2009.01)

(52) U.S. Cl.
CPC ........... *H04W 68/02* (2013.01); *H04W 4/028* (2013.01)

(58) Field of Classification Search
CPC ..... H04W 4/028; H04W 68/02; H04W 68/00; H04W 68/005; H04W 68/04
USPC ....................................................... 455/458
See application file for complete search history.

(56) References Cited

U.S. PATENT DOCUMENTS

| | | | |
|---|---|---|---|
| 7,489,936 B1* | 2/2009 | Liu | H04W 8/02 455/456.1 |
| 8,224,357 B2* | 7/2012 | Del Signore | H04W 68/04 455/458 |
| 2008/0293437 A1* | 11/2008 | Ranganathan | H04W 68/025 455/458 |
| 2014/0113666 A1* | 4/2014 | Arvidsson | H04W 68/00 455/458 |
| 2015/0038180 A1* | 2/2015 | Quick, Jr. | H04W 76/06 455/458 |

(Continued)

OTHER PUBLICATIONS

"Alphas, P-Values, and Confidence Intervals, Oh My!". Michelle Paret. http://blog.minitab.com/blog/michelle-paret/alphas-p-values-confidence-intervals-oh-my. Published Oct. 2012.*

*Primary Examiner* — Nathan Mitchell
(74) *Attorney, Agent, or Firm* — Harness, Dickey & Pierce, P.L.C.

(57) ABSTRACT

Methods and systems for improving paging efficiency of a user equipment method including obtaining a history of the user equipment, the history including one or more past locations of the user equipment, obtaining a mobility pattern of the user equipment, the mobility pattern including one or more of a plurality of mobility categories, determining a confidence level for an associated location of the user equipment based on at least one of the mobility pattern and the history, the confidence level indicating a level of confidence that the user equipment is at the associated location, and deriving a paging range based on the confidence level, the paging range including one of a plurality of paging scopes, each of the plurality of paging scopes including at least one of a geographic or location extent, a paging frequency, a single node, a plurality of nodes, a tracking area and a plurality of tracking areas.

21 Claims, 5 Drawing Sheets

(56) References Cited

U.S. PATENT DOCUMENTS

| | | | |
|---|---|---|---|
| 2015/0163639 A1* | 6/2015 | Kilpatrick, II | H04W 4/028 455/456.1 |
| 2015/0215742 A1* | 7/2015 | Ikeda | H04W 68/04 455/456.1 |
| 2015/0215895 A1* | 7/2015 | Iwai | H04W 68/04 455/458 |

* cited by examiner

ADAPTIVE PAGING USING USER EQUIPMENT LOCALIZATION METHOD IN A NETWORK

BACKGROUND

1. Field of Invention

Example embodiments relate to methods and/or systems for improving paging efficiency of a user equipment (UE) device in a network.

2. Description of Related Art

Since paging messages initiated by an MME (Mobility Management Entity) comprise a significant portion of the signaling traffic involving evolved Node B's (eNodeB's or base stations) on a Long Term Evolution (LTE) network, there is an ongoing effort to reduce paging message traffic while maximizing paging effectiveness. Paging efficiency is of increasing importance since the number of eNodeB's in tracking areas is growing as vendors enhance their LTE networks to support more customers.

A typical paging range selection indicating how aggressively the MME will page a UE (User Equipment) is based on a current UE reactivation scenario type. A less aggressive paging range may start with targeted paging (e.g., paging of one or a plurality of eNodeB's), and a more aggressive paging range may start with wide area paging such as paging the entire tracking area or a plurality of tracking areas (e.g., paging all eNodeB's of a tracking area or a plurality of tracking areas). For example, the MME will page a UE that is being reactivated for a best effort data session in a less aggressive manner that maximizes paging efficiency (i.e., limits paging message traffic) but uses additional time to reach the UE. However, when the MME needs to page a UE to deliver an incoming voice call, the UE will perform paging in a more aggressive manner to reach the UE quickly so the call can be delivered.

Other conventional applications page a UE regardless of the UE's most recent status and regardless of the time at which the UE was last paged. For example, even when the UE has been in an idle state for a short time such as a few seconds, the MME would still select an aggressive paging range to reach the UE for an incoming voice call. However, an aggressive paging range that initiates wide area paging is wasteful in this situation since the location of the UE can be limited to a single node (i.e., a last seen eNodeB) due to the short time the UE has been in the idle state.

SUMMARY

In light of the above, example embodiments relate to systems and methods of improving paging efficiency of a user equipment method including obtaining a history of the user equipment, the history including one or more past locations of the user equipment, obtaining a mobility pattern of the user equipment, the mobility pattern including one or more of a plurality of mobility categories, determining a confidence level for an associated location of the user equipment based on at least one of the mobility pattern and the history, the confidence level indicating a level of confidence that the user equipment is at the associated location, and deriving a paging range based on the confidence level, the paging range including one of a plurality of paging scopes, each of the plurality of paging scopes including at least one of a geographic or location extent and a paging frequency. According to at least one example embodiment, the plurality of paging scopes may include one of a single node, a plurality of nodes, a tracking area and a plurality of tracking areas.

According to at least one example embodiment, determining the confidence level for the associated location of the user equipment includes selecting the confidence level from one of a plurality of confidence levels based on one of the obtained history and the obtained mobility pattern.

According to at least one example embodiment, one of a plurality of categories of history are obtained, each of the plurality of categories of history indicating one or more of the past locations of the user equipment. In addition, each of the plurality of confidence levels may correspond to a respective one of the plurality of mobility categories and the plurality of categories of history. The method also includes selecting the confidence level corresponding to the obtained mobility categories and the plurality of categories of history.

According to at least one example embodiment, the confidence level increases as at least one of a size of the one or more past locations, the age of the location, and the mobility pattern of the user equipment decreases. The age of the location may be the time elapsed since the last determination of the location.

According to at least one example embodiment, the paging range increases as the confidence level decreases.

According to at least one example embodiment, each of the plurality of paging scopes corresponds to a respective one of the plurality of confidence levels, and the derived paging range corresponds to the selected confidence level.

According to at least one example embodiment, the plurality of categories of history include one of a single node, a plurality of nodes, a tracking area and a plurality of tracking areas.

According to at least one example embodiment, determining the confidence level includes determining a first confidence level when the obtaining the history includes obtaining the single node, determining a second confidence level lower than the first confidence level when the obtaining the history includes obtaining the plurality of nodes, determining a third confidence level lower than the second confidence level when the obtaining the history includes obtaining the tracking area, and determining a fourth confidence level lower than the third confidence level when the obtaining the history includes obtaining the plurality of tracking areas.

According to at least one example embodiment, if the confidence level is the first confidence level, deriving the paging range comprises selecting the single node and the method further comprises paging the selected single node. Also, if the confidence level is the second confidence level, deriving the paging range comprises selecting the plurality of nodes and the method further comprises paging the selected plurality of nodes. If the confidence level is the third confidence level, deriving the paging range includes selecting the tracking area and the method further comprises paging the selected tracking area. If the confidence level is the fourth confidence level, deriving the paging range comprises selecting the plurality of tracking areas and the method further comprises paging the selected plurality of tracking areas.

According to at least one example embodiment, one of the first confidence level, the second confidence level and the third confidence level are determined if the obtaining the history comprises obtaining the history within a time period.

According to at least one example embodiment, the fourth confidence level is determined if the history is obtained outside the time period.

According to at least one example embodiment, the mobility pattern includes a stationary pattern when the single node is obtained, and the mobility pattern includes one of the toggling pattern and the moving pattern when the history includes one of the plurality of nodes, the tracking area and the plurality of tracking areas.

According to at least one example embodiment, the mobility pattern includes the moving pattern when more than one node are along a direction.

According to at least one example embodiment, when the stationary pattern is obtained, the determined confidence level is the first confidence level, and when the one of the toggling pattern and the moving pattern are obtained, the determined confidence level is lower than the first confidence level.

Additional advantages and novel features of these example embodiments will be set forth in part in the description that follows, and in part will become more apparent to those skilled in the art upon examination of the following or upon learning by practice of the example embodiments.

BRIEF DESCRIPTION OF THE DRAWINGS

Various example embodiments of the systems and methods will be described in detail, with reference to the following figures, wherein.

DETAILED DESCRIPTION

Figure 1:
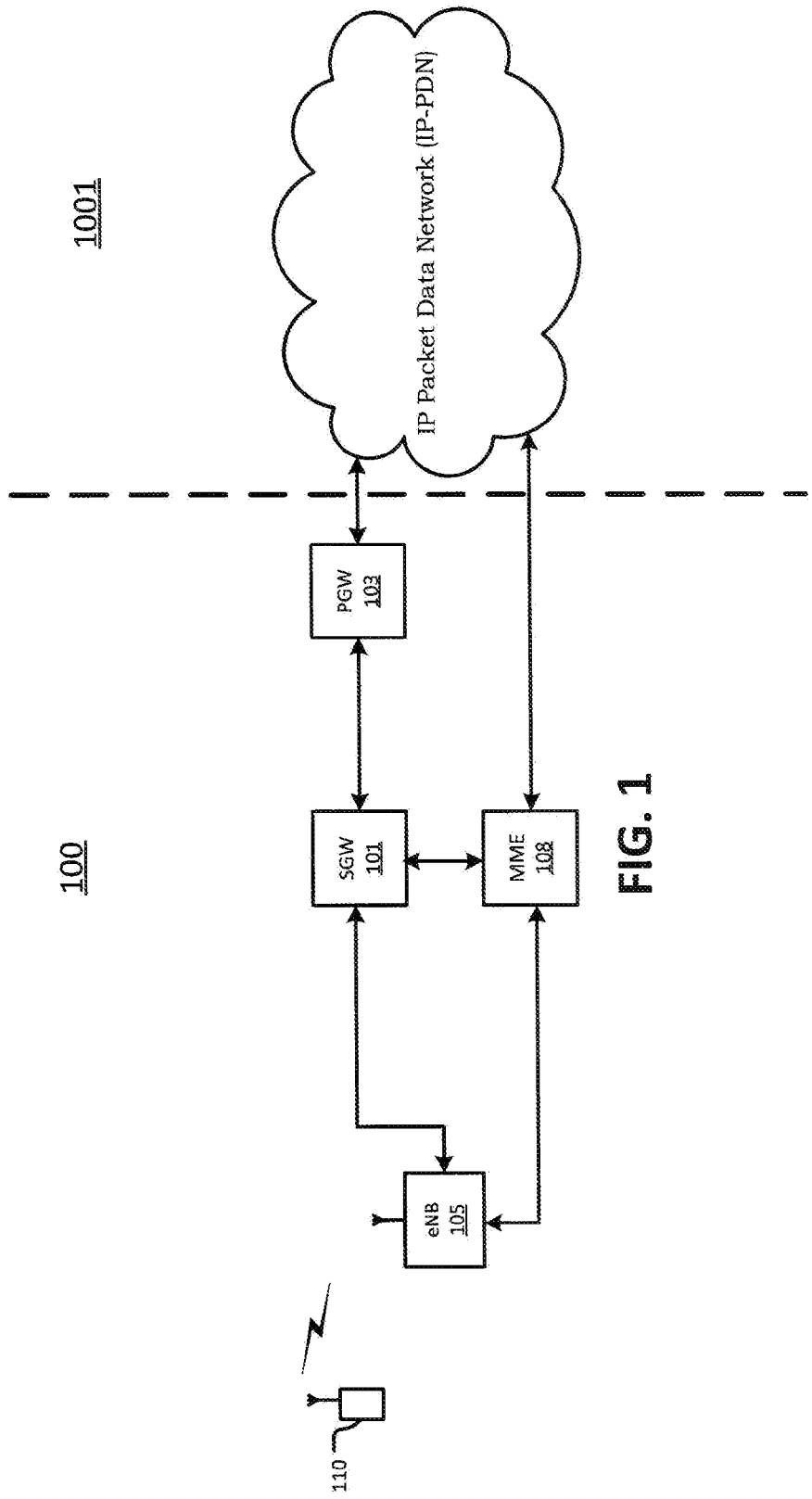
FIG. 1 is a diagram illustrating a portion of an Evolved Packet System (EPS).

These and other features and advantages are described in, or are apparent from, the following detailed description of various example embodiments.

It will be understood that when an element is referred to as being "on," "connected" or "coupled" to another element, it can be directly on, connected or coupled to the other element or intervening elements may be present. In contrast, when an element is referred to as being "directly on," "directly connected" or "directly coupled" to another element, there are no intervening elements present. As used herein the term "and/or" includes any and all combinations of one or more of the associated listed items. Further, it will be understood that when a layer is referred to as being "under" another layer, it can be directly under or one or more intervening layers may also be present. In addition, it will also be understood that when a layer is referred to as being "between" two layers, it can be the only layer between the two layers, or one or more intervening layers may also be present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein. As used herein, expressions such as "at least one of," when preceding a list of elements, modify the entire list of elements and do not modify the individual elements of the list.

As used herein, the term "eNodeB" or "eNB" may be considered synonymous to, and may hereafter be occasionally referred to as a NodeB, base station, transceiver station, base transceiver station (BTS), etc., and describes a transceiver in communication with and providing wireless resources to users in a geographical coverage area. As discussed herein, eNBs may have all functionality associated with conventional, well-known base stations in addition to the capability and functionality to perform the methods discussed herein.

The term "user equipment" or "UE" as discussed herein, may be considered synonymous to, and may hereafter be occasionally referred to, as user, client, mobile unit, mobile station, mobile user, mobile, subscriber, user, remote station, access terminal, receiver, etc., and describes a remote user of wireless resources in a wireless communications network.

As discussed herein, uplink (or reverse link) transmissions refer to transmissions from user equipment (UE) to eNB (or network), whereas downlink (or forward link) transmissions refer to transmissions from eNB (or network) to UE.

According to example embodiments, the Packet Data Network Gateways (PGW), Serving Gateways (SGW), Mobility Management Entities (MME), UEs, eNBs, etc. may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs) computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

In more detail, for example, as discussed herein a MME, PGW and/or SGW may be any well-known gateway or other physical computer hardware system. The MME, PGW and/or SGW may include one or more processors, various interfaces, a computer readable medium, and (optionally) a display device. The one or more interfaces may be configured to transmit/receive (wireline or wirelessly) data signals via a data plane or interface to/from one or more other network elements (e.g., MME, PGW, SGW, eNBs, etc.); and to transmit/receive (wireline or wirelessly) controls signals via a control plane or interface to/from other network elements.

The MME, PGW and/or SGW may execute on one or more processors, various interfaces including one or more transmitters/receivers connected to one or more antennas, a computer readable medium, and (optionally) a display device. The one or more interfaces may be configured to transmit/receive (wireline and/or wirelessly) control signals via a control plane or interface.

The eNBs, as discussed herein, may also include one or more processors, various interfaces including one or more transmitters/receivers connected to one or more antennas, a computer readable medium, and (optionally) a display device. The one or more interfaces may be configured to transmit/receive (wireline and/or wirelessly) data or control signals via respective data and control planes or interfaces to/from one or more switches, gateways, MMEs, controllers, other eNBs, UEs, etc.

As discussed herein, the PGW, SGW, and MME may be collectively referred to as Evolved Packet Core network elements or entities (or core network elements or entities). The eNB may be referred to as a radio access network (RAN) element or entity.

Reference will now be made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description.

FIG. 1 illustrates a portion of an Evolved Packet System (EPS). The EPS includes an Internet Protocol (IP) Connectivity Access Network (IP-CAN) 100 and an IP Packet Data Network (IP-PDN) 1001.

Referring to FIG. 1, the IP-CAN 100 includes: a serving gateway (SGW) 101; a packet data network (PDN) gateway (PGW) 103; a mobility management entity (MME) 108, and an eNB 105. Although not shown, the IP-PDN 1001 portion of the EPS may include application or proxy servers, media servers, email servers, etc.

Within the IP-CAN 100, the eNB 105 is part of what is referred to as an Evolved Universal Mobile Telecommunications System (UMTS) Terrestrial Radio Access Network (EUTRAN), and the portion of the IP-CAN 100 including the SGW 101, the PGW 103, and the MME 108 is referred to as an Evolved Packet Core (EPC). Although only a single eNB 105 is shown in FIG. 1, it should be understood that the EUTRAN may include any number of eNBs. Similarly, although only a single SGW, PGW and MME are shown in FIG. 1, it should be understood that the EPC may include any number of these core network elements.

The eNB 105 provides wireless resources and radio coverage for UEs including UE 110. For the purpose of clarity, only one UE is illustrated in FIG. 1. However, any number of UEs may be connected (or attached) to the eNB 105. The eNB 105 is operatively coupled to the SGW 101 and the MME 108.

The SGW 101 routes and forwards user data packets, while also acting as the mobility anchor for the user plane during inter-eNB handovers of UEs. The SGW 101 also acts as the anchor for mobility between $3^{rd}$ Generation Partnership Project Long-Term Evolution (3GPP LTE) and other 3GPP technologies. For idle UEs, the SGW 101 terminates the downlink data path and triggers paging when downlink data arrives for UEs.

The PGW 103 provides connectivity between the UE 110 and the external packet data networks (e.g., the IP-PDN 1001) by being the point of entry/exit of traffic for the UE 110. As is known, a given UE may have simultaneous connectivity with more than one PGW for accessing multiple PDNs.

The PGW 103 also performs policy enforcement, packet filtering for UEs, charging support, lawful interception and packet screening, each of which are well-known functions. The PGW 103 also acts as the anchor for mobility between 3GPP and non-3GPP technologies, such as Worldwide Interoperability for Microwave Access (WiMAX) and $3^{rd}$ Generation Partnership Project 2 (3GPP2 (code division multiple access (CDMA) 1× and Enhanced Voice Data Optimized (EvDO)).

Still referring to FIG. 1, the eNB 105 is also operatively coupled to the MME 108. The MME 108 is the control-node for the EUTRAN, and is responsible for idle mode UE paging and tagging procedures including retransmissions. Idle mode may be a mode where the UE has not been used in a threshold amount of time of, for example, 10 minutes, 30 minutes or more. The MME 108 is also responsible for choosing a particular SGW for a UE during initial attachment of the UE to the network, and during intra-LTE handover involving Core Network (CN) node relocation. The MME 108 authenticates UEs by interacting with a Home Subscriber Server (HSS), which is not shown in FIG. 1.

Non Access Stratum (NAS) signaling terminates at the MME 108, and is responsible for generation and allocation of temporary identities for UEs. The MME 108 also checks the authorization of a UE to camp on a service provider's Public Land Mobile Network (PLMN), and enforces UE roaming restrictions. The MME 108 is the termination point in the network for ciphering/integrity protection for NAS signaling, and handles security key management.

The MME 108 also provides control plane functionality for mobility between LTE and 2G/3G access networks with the S3 interface from the SGSN (not shown) terminating at the MME 108. The MME 108 also terminates the S6a interface to the home HSS for roaming UEs.

According to at least some example embodiments the MME 108 also performs methods for improving and/or optimizing wireless network capacity. In one example the MME 108 adjusts a dormancy timer for the UE 110 based on (i) at least one load condition for the wireless network, and (ii) a comparison between each of a plurality of dormancy timer adjustment parameters and a corresponding one of a plurality of dormancy timer adjustment parameter threshold values. The MME 108 then outputs the adjusted dormancy timer to the eNB 105 serving the UE 110. As discussed herein, the dormancy timer may also be referred to as an inactivity timer or a dormancy timer threshold value.

The at least one load condition for the wireless network may include: a messaging overload condition at the eNB 105; a connected users overload condition at the eNB 105; and a core network messaging overload condition. The plurality of dormancy timer adjustment parameters may include at least a NAS service request rate SR_RATE and connection time change parameter $\Delta_{CT}$ for the UE 110. Each of the NAS service request rate SR_RATE and connection time change parameter $\Delta_{CT}$ will be discussed in more detail later.

In response to receiving the adjusted dormancy timer, the eNB 105 adjusts connection time parameters for the UE thereby improving capacity of the wireless network while taking into account variability of traffic patterns during different busy periods, and addressing user device battery life concerns.

The methods performed at the MME 108 and the eNB 105 discussed above will be described in more detail later with regard to FIGS. 3 and 4.

Figure 2:
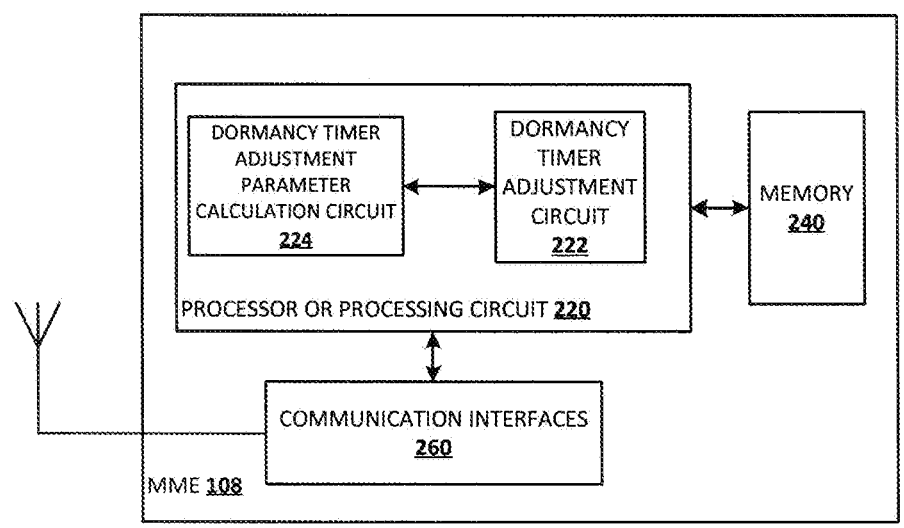
FIG. 2 is a block diagram illustrating a mobility management entity (MME).

FIG. 2 is a block diagram illustrating a more detailed example embodiment of the MME 108 shown in FIG. 1.

Referring to FIG. 2, the MME 108 includes a memory 240, a MME processing circuit 220, and communication interfaces 260. The MME processing circuit 220 may also be referred to as a MME processor, a core network entity processing circuit, an EPC entity processing circuit, and may include hardware, software and/or firmware.

The MME processing circuit 220 is operatively coupled to the memory 240 and the communication interfaces 260.

The MME processing circuit 220 may be configured to retrieve information to execute instructions stored in memory such as memory 240, and includes a dormancy timer adjustment parameter calculation circuit 224 and a dormancy timer adjustment circuit 222. Both the dormancy timer adjustment parameter calculation circuit 224 and the dormancy timer adjustment circuit 222 may include hardware, software and/or firmware. The dormancy timer adjustment parameter calculation circuit 224 is operatively coupled to the dormancy timer adjustment circuit 222. The dormancy timer adjustment circuit 222 may also be referred to as an inactivity timer adjustment circuit 222. The dormancy timer adjustment parameter calculation circuit 224 may also be referred to as an inactivity timer adjustment parameter calculation circuit 224.

Still referring to FIG. 2, the communication interfaces 260 include various interfaces including one or more transmitters/receivers connected to one or more antennas to transmit/receive (wireline and/or wirelessly) control signals via a control plane or interface to other EPC network elements and/or RAN elements.

As discussed in more detail later, the memory 240 may store, in part, network status and UE activity history information (also referred to as a signaling event history information) for UEs attached to the eNBs associated with the MME 108. The memory 240 may also store status indicators indicating messaging overload conditions and connected users overload conditions for eNBs, as well as messaging overload conditions for the EPC.

Figure 3:
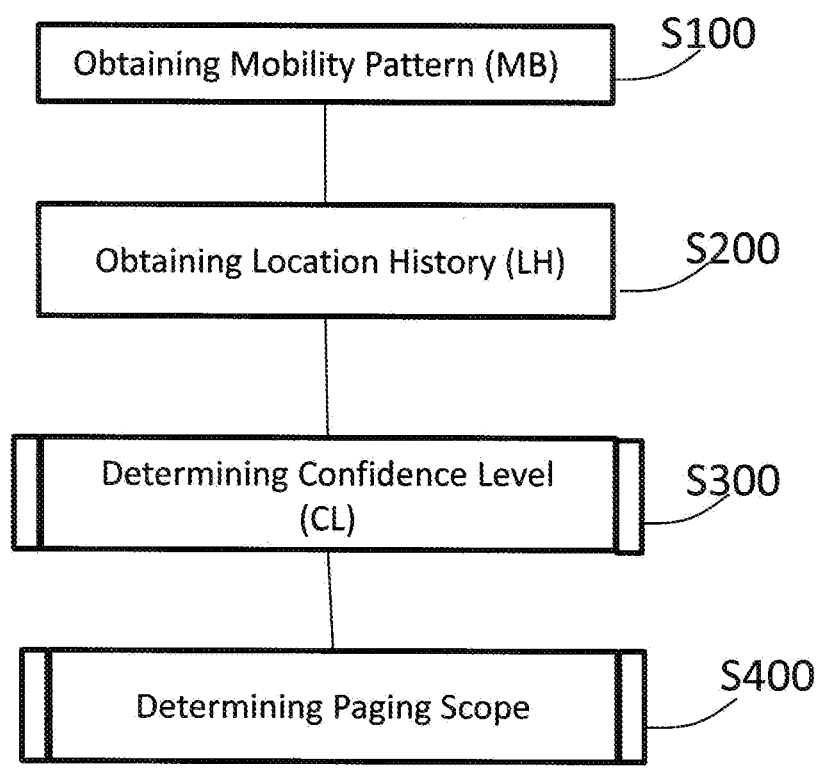
FIG. 3 is a flow chart illustrating a method of improving paging efficiency of a user equipment, according to at least one example embodiment.

FIG. 3 is a flow chart illustrating a method of improving paging efficiency of a user equipment, according to at least one example embodiment. In FIG. 3, the example method starts at S100, where the mobility pattern of a given user equipment (UE) is obtained via, for example, the processor 220. For example, the mobility pattern may include one or more categories such as a stationary pattern, where the UE remains in a same node or location for a given period of time, a toggling pattern, where the UE travels between the same two or more nodes or locations within the given period of time, and a moving pattern, where the UE travels from one node to another one or more nodes along a given direction within the period of time. The period of time within which the location of UE is determined via, for example, the processor 220, is indicative of the age of the location data, and the shorter the period of time, the more reliable the location of the UE.

When the mobility pattern is obtained, according to at least one example embodiment, the location history (LH) of the UE is obtained at S200 via, for example, the processor 220. For example, the location history may include the number and locations of any nodes where the UE was present, or was in the vicinity of, within a given period of time. The age of the location information is also indicative of the confidence level that the UE is at a given node or nodes at the time of paging the UE. For example, the shorter the period of time, the greater the confidence level that the UE is located at a given node or group of nodes.

The method continues to S300, where the confidence level (CL) of the location of the UE is determined via, for example, the processor 220. For example, the older the age of the location information, the lower the confidence level that the UE is at a given node or group of nodes at the time of paging the UE. According to at least one example embodiment, a plurality of confidence levels may be determined via, for example, the processor 220, each of the confidence levels corresponding to, for example, the combination of a mobility pattern and an age of the location information. Specifically, the confidence level of having a given UE at or near a given node may be inversely proportional to the age of the last location information of the UE, which indicates the time since the location information has been obtained. The confidence level may also depend on the mobility pattern of the UE. For example, for the same age of the location information, the confidence level of the UE may be lower if the UE is determined via, for example, the processor 220, to be in a moving pattern than if the UE is determined to be in a toggling pattern, and the confidence level may be lower when the UE is determined to be in a toggling pattern than when the UE is determined to be in a stationary pattern.

The method continues to S400, where the paging range is determined, for example, via the processor 220, based on the location history of the UE, the mobility pattern of the UE and/or the confidence level of the location of the UE. For example, in estimating the last location of the UE, the paging range may include paging a single node via, for example, the processor 220 and the communication interfaces 260. In other examples, estimating the last location of the UE, may determine that the paging range includes paging a plurality of nodes, paging a tracking area, or paging a plurality of tracking areas via the processor 220 and the communication interfaces 260.

Figure 4:
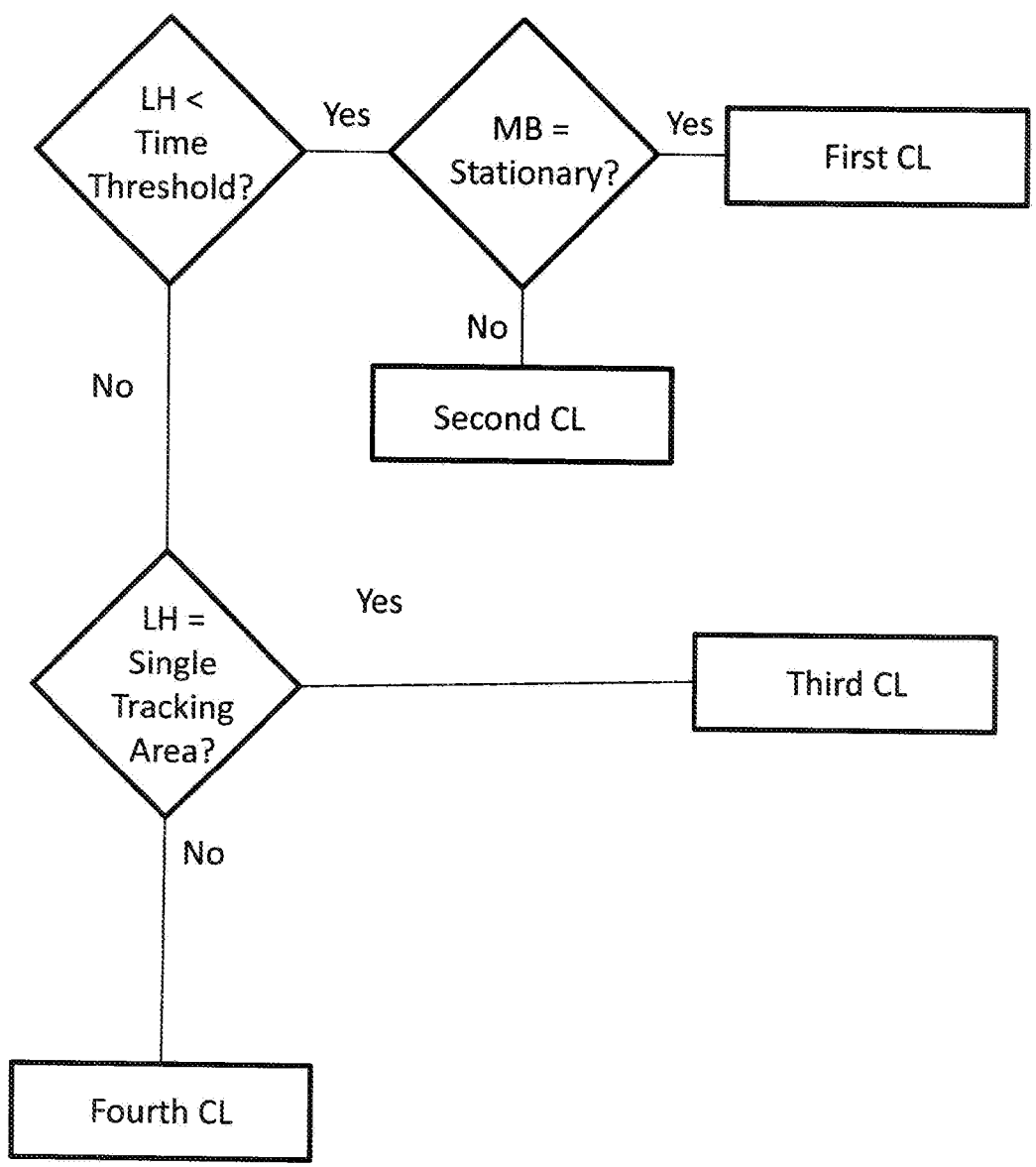
FIG. 4 is a flow chart illustrating a method of determining a confidence level for the location of a user equipment, according to at least one example embodiment.

FIG. 4 is a flow chart illustrating a method of determining a confidence level of a user equipment, according to at least one example embodiment. At S310, the location history of the UE is compared to a given time threshold via, for example, the processor 220. Accordingly, the age of the location information of the UE is determined via, for example, the processor 220. If the location history (LH) of the UE is determined within the time threshold, which means that the location history has been determined relatively recently, such as e.g., 10 seconds, then at S320, the processor 220 determines whether the mobility pattern of the UE is stationary. Accordingly, at S320, the processor 220 determines whether the UE has been stationary for a period of time that is shorter than a second time threshold. If the UE has been determined to be stationary within the second time threshold, then at S330, the confidence level for the location of the UE is determined to be a first confidence level, for example, via the processor 220.

If at S320, the processor 220 determines that the UE has not been stationary within the second time threshold, then at S340, the processor 220 determines the confidence level for the location of the UE to be a second confidence level that is lower than the first confidence level.

According to at least one example embodiment, if at S310, the processor 220 determines the location history at a time older than the time threshold, which means that the age of the location history is beyond the time threshold (e.g., LH time is <current time−time threshold), then at S350, a determination is made whether the UE was within a single tracking area where the UE was last located. If the processor 220 determines that the UE was within the single tracking area at the time the location of the UE was determined, then, at S360, the processor 220 determines the confidence level for the location of the UE to be a third confidence level that is lower than the second confidence level.

If at S350, the location history includes more than a single tracking area, then at S370, the confidence level for the location of the UE is determined, for example via the processor 220, to be a fourth confidence level that is lower than the third confidence level.

Figure 5:
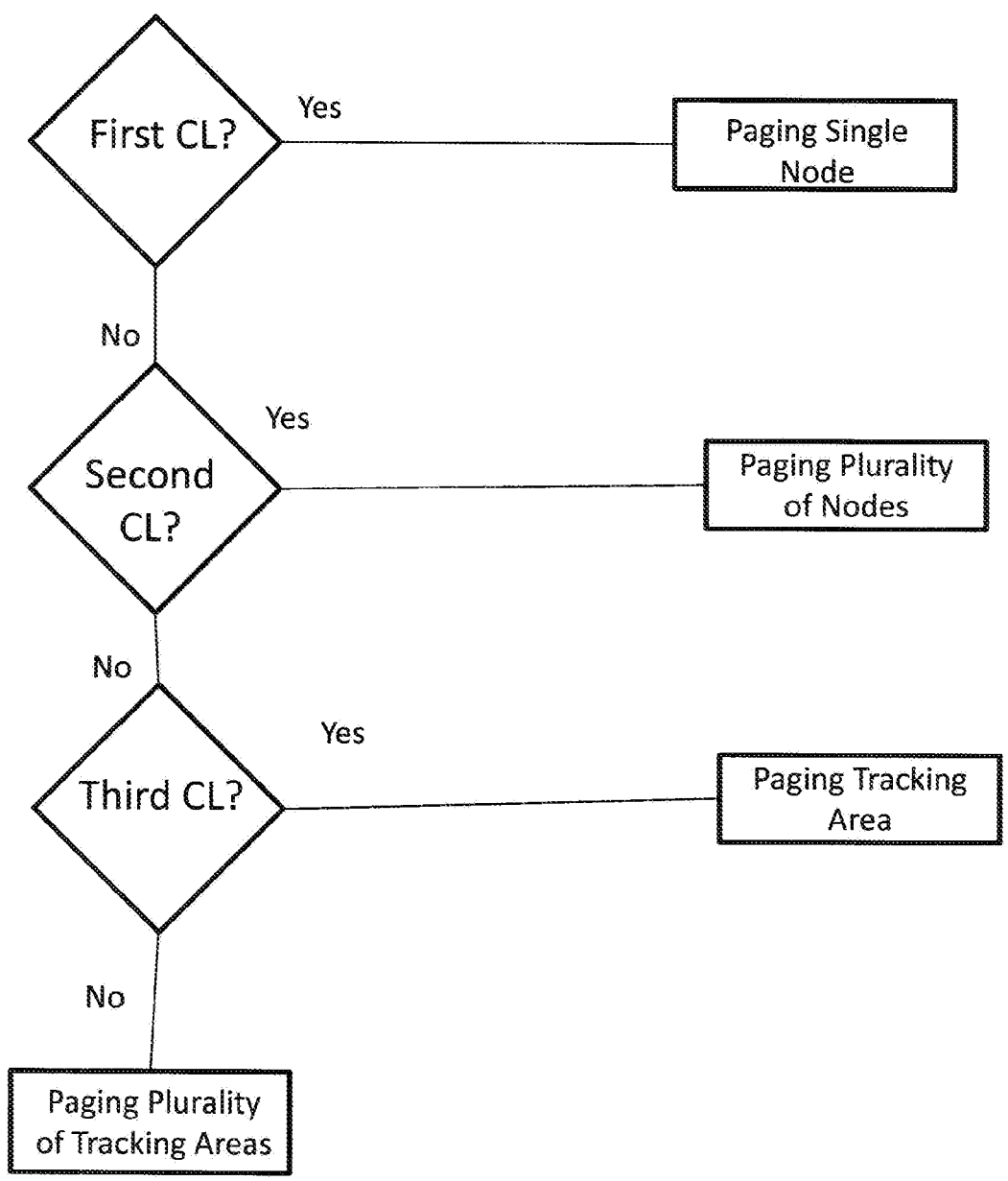
FIG. 5 is a flow chart illustrating a method of determining the paging range of a user equipment, according to at least one example embodiment.

FIG. 5 is a flow chart illustrating a method of determining the paging range of a user equipment, according to at least one example embodiment. In FIG. 5, the paging range is determined based on the confidence level for the location of the UE. Accordingly, if the confidence level is the first confidence level, as determined in S410, then the paging range includes a single node, and the single node is paged at S420. According to an example embodiment, the node where the UE was last located and for which the age of location is sufficiently recent will be paged at S420. For example, the age of location of the UE is considered to be sufficiently recent when the location information is obtained within a time shorter than the first time threshold, such as e.g., about 10 seconds. The longer the time since the UE location is determined to be at the single node, the more the confidence level will drop.

If the confidence level at S430 is the second confidence level, then a plurality of nodes, which may be the last several locations of the UE within a time threshold, may be paged at S440. Accordingly, the paging range includes the plurality of nodes. The plurality of nodes includes nodes where the UE was last located and for which the age of location is sufficiently recent. This plurality of nodes or paging range will be paged at S440. The longer the time since the UE location is determined to be at the plurality of nodes, the more the confidence level will drop. However, for a substantially same amount of time since the location of the UE was obtained, the drop in confidence level for the plurality of nodes may be greater than the drop in confidence level for a single node. This difference in the drop of the confidence level may be because, in the case of a plurality of nodes, the UE may change location among the different nodes of the plurality of nodes during the time since the last UE location was obtained. Furthermore, for a substantially same amount of time since the location of the UE was obtained and for the same location history, the confidence level drops more when the mobility pattern is a moving pattern than when the mobility pattern is a toggling pattern. Also, the confidence level drops more when the mobility pattern is a toggling pattern than when the mobility pattern is a stationary pattern.

According to an example embodiment, if the confidence level at S450 is the third confidence level, then substantially all the tracking area will be paged at S460. A tracking area typically includes a number of nodes that is substantially larger than in the plurality of nodes discussed above. The longer the passage of time at which the UE location is determined to be at the tracking area, the more the confidence level will drop. However, for a substantially same amount of time since the location of the UE was obtained, the drop in confidence level for the tracking area may be greater than the drop in confidence level for a plurality of nodes or for a single node. This difference in the drop of the confidence level may be because, in the case of a tracking area, the UE may change location among the larger number of nodes of the tracking area during the time since the last UE location was obtained, and is thus less likely to be more definitely obtained.

According to an example embodiment, if the confidence level at S450 is not the third confidence level, and is thus by default the fourth confidence level, then the plurality of tracking areas where the UE might have been located at a time prior to the time of paging, may be paged at S470. The longer the passage of time at which the UE location is determined to be at the plurality of tracking areas, the more the confidence level will drop. However, for a same age of the location information of the UE, the drop in confidence level for the plurality of tracking areas may be greater than the drop in confidence level for a single tracking area. For example, in the case of a plurality of tracking areas, the UE may change location among a larger number of nodes than in a single tracking area during the same time since the last UE location was obtained. Accordingly, the location of the UE is less definitely obtained in a plurality of tracking areas than in a single tracking area.

In view of at least the above, the paging methodology used to page a given UE when an incoming call is received can be tailored based on the location information of the UE, where the age of the UE location may be proportional to the accuracy of the location of the UE. Thus, a less aggressive paging range may be implemented when the location of the UE is better defined and a more aggressive paging range may be implemented when the location of the UE is less known. As a result, paging efficiency and effectiveness are improved when only a single node or a plurality of nodes are paged, instead of an entire tracking area or a plurality of tracking areas. This described paging methodology reduces network traffic and improves communication efficiency and speed.

While example embodiments have been described in conjunction with the example features outlined above, various alternatives, modifications, variations, improvements, and/or substantial equivalents, whether known or that are or may be presently unforeseen, may become apparent to those having at least ordinary skill in the art. Accordingly, the example embodiments, as set forth above, are intended to be illustrative, not limiting. Various changes may be made without departing from the spirit and thereof. Therefore, the example embodiments are intended to embrace all known or later-developed alternatives, modifications, variations, improvements, and/or substantial equivalents.

What is claimed is:

1. A method for paging a user equipment, the method comprising:
   obtaining a location history of the user equipment, the location history including at least one location of the user equipment and a corresponding age of the location of the user equipment;
   obtaining a mobility pattern of the user equipment, the mobility pattern indicating one of a plurality of mobility categories, the plurality of mobility categories including a stationary pattern, a toggling pattern and a moving pattern;
   determining a probability level for the at least one location of the user equipment based on the mobility pattern and the location history, the probability level indicating a level of confidence that the user equipment is at the at least one location; and
   deriving a paging range based on the probability level, the paging range having one of a plurality of paging scopes, the plurality of paging scopes including at least one of a group consisting of a single node, a plurality of nodes, a tracking area and a plurality of tracking areas;
   wherein the probability level increases as at least one of a size of one or more past locations, the age of the location, and the mobility pattern of the user equipment decreases.

2. The method of claim 1, wherein the determining selects the probability level from one of a plurality of probability levels based on the location history of the user equipment and the mobility pattern of the user equipment.

3. The method of claim 2, wherein
   the obtaining the location history comprises obtaining one of a plurality of categories of history, each of the plurality of categories of history indicating at least one of past locations and the age of location of the user equipment;
   each of the plurality of probability levels corresponds to a respective at least one of the plurality of mobility categories and the plurality of categories of history; and
   the determining selects the probability level corresponding to the obtained at least one of the plurality of mobility categories and the plurality of categories of history.

4. The method of claim 3, wherein the paging range increases as the probability level decreases.

5. The method of claim 4, wherein
   ones of the plurality of paging scopes correspond to respective ones of the plurality of probability levels; and
   the paging range derived corresponds to the probability level selected.

6. The method of claim 3, wherein the plurality of categories of history comprise one of a group consisting of a single node, a plurality of nodes, a tracking area and a plurality of tracking areas.

7. The method of claim 6, wherein the determining the probability level comprises:
   determining a first probability level when the obtaining the location history includes obtaining the single node;
   determining a second probability level lower than the first probability level when the obtaining the location history includes obtaining the plurality of nodes;
   determining a third probability level lower than the second probability level when the obtaining the location history includes obtaining the tracking area; and
   determining a fourth probability level lower than the third probability level when the obtaining the location history includes obtaining the plurality of tracking areas.

8. The method of claim 7, wherein
   if the probability level is the first probability level:
   deriving the paging range comprises selecting the single node; and
   the method further comprises paging the selected single node;
   if the probability level is the second probability level:
   deriving the paging range comprises selecting the plurality of nodes; and
   the method further comprises paging the selected plurality of nodes;
   if the probability level is the third probability level:
   deriving the paging range comprises selecting the tracking area; and
   the method further comprises paging the selected tracking area; and
   if the probability level is the fourth probability level:
   deriving the paging range comprises selecting the plurality of tracking areas; and
   the method further comprises paging the selected plurality of tracking areas.

9. The method of claim 7, wherein the determining the probability level determines one of a group consisting of the first probability level, the second probability level and the third probability level if the obtaining the location history comprises obtaining the location history within a time period.

10. The method of claim 9, wherein the determining the probability level determines the fourth probability level if the obtaining the location history comprises obtaining the location history outside the time period.

11. The method of claim 7, wherein
    the mobility pattern comprises a stationary pattern when the obtaining the location history obtains the single node; and
    the mobility pattern comprise one of the toggling pattern and the moving pattern when the obtaining the location history obtains one of a group consisting of the plurality of nodes, the tracking area and the plurality of tracking areas.

12. The method of claim 11, wherein the mobility pattern comprises the moving pattern when more than one node are along a direction.

13. The method of claim 10, wherein when the obtaining the mobility pattern obtains the stationary pattern, the determined probability level is the first probability level.

14. The method of claim 10, wherein when the obtaining the mobility pattern obtains one of the toggling pattern and the moving pattern, the determined probability level is lower than the first probability level.

15. A system for paging a user equipment, the system comprising:
    a first obtaining unit configured to obtain a location history of the user equipment, the location history including at least one location of the user equipment and a corresponding age of the location of the user equipment;

a second obtaining unit configured to obtain a mobility pattern of the user equipment, the mobility pattern indicating one of a plurality of mobility categories, the plurality of mobility categories including a stationary pattern, a toggling pattern and a moving pattern;

a determining unit configured to determine a probability level for the at least one location of the user equipment based on the mobility pattern and the location history, the probability level indicating a level of confidence that the user equipment is at the at least one location; and a deriving unit configured to derive a paging range based on the probability level, the paging range having one of a plurality of paging scopes, the plurality of paging scopes including at least one of a group consisting of a single node, a plurality of nodes, a tracking area and a plurality of tracking areas;

wherein the probability level increases as at least one of a size of one or more past locations, the age of the location, and the mobility pattern of the user equipment decreases.

16. The system of claim 15, wherein the determining unit is configured to select the probability level from one of a plurality of probability levels based on the location history of the user equipment and the mobility pattern of the user equipment.

17. The system of claim 16, wherein
the location history comprises one of a plurality of categories of history, each of the plurality of categories of history indicating at least one of past locations and the age of location of the user equipment;
each of the plurality of probability levels corresponds to a respective at least one of the plurality of mobility categories and the plurality of categories of history; and
the selected probability level corresponds to the obtained at least one of the plurality of mobility categories and the plurality of categories of history.

18. The system of claim 17, wherein the probability level increases as at least one of a group consisting of a size of the one or more past locations, the age of the location, and the mobility pattern of the user equipment decreases.

19. The system of claim 15, wherein the determined probability level comprises:
a first probability level when the location history includes the single node;
a second probability level lower than the first probability level when the location history includes the plurality of nodes;
a third probability level lower than the second probability level when the location history includes the tracking area; and
a fourth probability level lower than the third probability level when the location history includes the plurality of tracking areas.

20. The method of claim 1, wherein
the moving pattern is a pattern in which the user equipment travels from one node to one or more other nodes along a direction within a period of time; and
the toggling pattern is a pattern in which the user equipment travels only between two or more nodes within the period of time.

21. The system of claim 15, wherein
the moving pattern is a pattern in which the user equipment travels from one node to one or more other nodes along a direction within a period of time; and
the toggling pattern is a pattern in which the user equipment travels only between two or more nodes within the period of time.

* * * * *